(12) United States Patent
Miki et al.

(10) Patent No.: US 7,423,939 B2
(45) Date of Patent: Sep. 9, 2008

(54) METHOD FOR MANUFACTURING MAGNETO-OPTICAL RECORDING MEDIUM

(75) Inventors: Takeshi Miki, Tokyo (JP); Kazuhiko Fujiie, Kanagawa (JP); Yasuhito Tanaka, Tokyo (JP); Goro Fujita, Kanagawa (JP); Tetsuhiro Sakamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 810 days.

(21) Appl. No.: 10/779,337

(22) Filed: Feb. 13, 2004

(65) Prior Publication Data
US 2004/0229085 A1 Nov. 18, 2004

(30) Foreign Application Priority Data
Feb. 17, 2003 (JP) ............................. 2003-038699

(51) Int. Cl.
*G11B 11/00* (2006.01)
*C23C 14/35* (2006.01)
*C23C 16/00* (2006.01)

(52) U.S. Cl. ............... 369/13.55; 369/13.52; 369/13.5; 369/13.47; 369/13.46; 369/13.45; 369/13.42; 369/13.41; 369/13.4; 369/13.38; 369/13.24; 204/192.2; 427/130

(58) Field of Classification Search ............. 369/13.24, 369/13.38, 13.4, 13.41, 13.42, 13.45, 13.46, 369/13.47, 13.5, 13.52, 13.55; 204/192.2; 427/130
See application file for complete search history.

(56) References Cited

U.S. PATENT DOCUMENTS 6,716,489 B2 * 4/2004 Miyaoka ............... 427/548
6,767,697 B2 * 7/2004 Uchida et al. ............... 430/321
2004/0076083 A1 * 4/2004 Nishikawa et al. ....... 369/13.47

FOREIGN PATENT DOCUMENTS

JP 06-290496 10/1994
JP 08-147777 6/1996

* cited by examiner

*Primary Examiner*—Rodney G McDonald
(74) *Attorney, Agent, or Firm*—Robert J. Depke; Rockey, Depke & Lyons, LLC.

(57) ABSTRACT

A method for manufacturing a magneto-optical recording medium in which reading of recorded information is performed through domain wall displacement in a reproduction layer is provided, in which magnetic separation of groove side-wall portions is performed more reliably; as a result a magneto-optical recording medium with satisfactory recording and reproduction characteristics can be provided. The method is to manufacture a magneto-optical recording medium in which on a substrate 1 having grooves 12 at least a reproduction layer and a recording layer, each of which is formed of magnetic layers, are deposited and recorded information is reproduced through domain wall displacement in the reproduction layer; and the method includes a first annealing process in which, after depositing at least the reproduction layer and recording layer on the substrate 1 on which are formed lands 11 and grooves 12, only side-wall portions 13 between adjacent lands 11 and grooves 12 are irradiated with laser light L1, and a second magnetization annealing process in which regions including adjacent side-wall portions 13 and lands between side-wall portions 13 are irradiated with laser light L2 having a spot diameter greater than the spot diameter of the laser light in the first annealing process, while applying an external magnetic field $H_{ex}$.

8 Claims, 3 Drawing Sheets

METHOD FOR MANUFACTURING MAGNETO-OPTICAL RECORDING MEDIUM

BACKGROUND OF THE INVENTION

1. Field of the Invention

This invention relates to a method for manufacturing a magneto-optical recording medium, in which at least a reproduction layer and recording layer are deposited on a substrate, and reproduction of recorded information is performed by means of domain wall displacement in the reproduction layer.

2. Description of the Related Art

Various types of rewritable magneto-optical recording media have been commercialized, in which recording marks based on magnetic domains corresponding to recording information are written in a magnetic thin film, and magneto-optical effects are employed to read this information.

Various methods have been proposed to raise the recording densities and increase the storage capacities of such magneto-optical recording media; one of those is the MSR (Magnetically Super Resolution) method, which performs ultra-high resolution reproduction surpassing the optical diffraction limit, and various MSR methods have been proposed.

For example, a DWDD (Domain Wall Displacement Detection) method has been proposed (see for example Japanese Patent Publication No. 3332458) in which a magnetic layer including a reproduction layer, recording layer and similar is deposited on a substrate, recording marks recorded in the recording layer are transferred to the reproduction layer during reproduction, and the temperature distribution within the spot of reproduction light is utilized to form a region in which the extent of domain wall displacement in the reproduction layer is increased, so that by reading recording marks, which are small compared with the diameter of the spot of reproduction light, expanded through displacement of the walls of domains in the reproduction layer, the optical diffraction limit can be surpassed.

In magneto-optical recording media employing this DWDD method, because reading is performed through displacement of the walls of domains of recording marks, particularly when adopting a land and groove recording method in which information is recorded on guide grooves or so-called grooves provided in the substrate and on so-called lands between grooves, the regions between adjacent recording tracks are the side-wall portions of the guide grooves, and magnetic separation in these side-wall portions affects the recording and reproduction characteristics.

In light of the above problem, methods have been proposed to obtain satisfactory magnetic separation by, for example, performing annealing of the side-wall portions of grooves between adjacent recording tracks using a laser or other means, rendering the magnetic layer between adjacent tracks nonmagnetic or in-plane magnetized film in this portion (see for example Japanese Patent Laid-open No. Heisei 08-147777).

SUMMARY OF THE INVENTION

The present invention has the object of providing a method for manufacturing a magneto-optical recording medium such as magneto-optical recording media based on the so-called DWDD method, in which readout of recorded information is performed by the above-described domain wall displacement in a reproduction layer, and the magnetic separation of groove side-wall portions is performed more reliably; and accordingly, providing a magneto-optical recording medium with satisfactory recording and reproduction characteristics.

This invention is a method for manufacturing a magneto-optical recording medium, in which at least a reproduction layer and a recording layer formed of magnetic films are deposited on a substrate having grooves, and recorded information is reproduced through domain wall displacement in the reproduction layer; and the method has a first annealing process in which, after deposition of at least a reproduction layer and recording layer on a substrate on which lands and grooves are formed, only the side-wall portions between adjacent lands and grooves are irradiated with laser light, and a second magnetization annealing process in which, while applying an external magnetic field, a region including adjacent side-wall portions and the land therebetween is irradiated with laser light having a spot diameter which is large compared with the spot diameter of laser light in the first annealing process.

As explained above, in this invention, after performing the first annealing in which the side-wall portions of grooves are irradiated with laser light, a second magnetization annealing is performed in which a region including adjacent side-wall portions and the land between the side-wall portions is irradiated with laser light while applying an external magnetic field.

According to the manufacturing method of this invention, as is explained in detail in the Description of the Preferred Embodiments below, recording and reproduction characteristics can be improved compared with the case of the above-described conventional manufacturing methods in which annealing is performed without applying an external magnetic field to the side-wall portions.

It is assumed that rather than merely rendering side-wall portions nonmagnetic or in-plane magnetized films through annealing, by applying an external magnetic field during the second magnetization annealing the annealed area is magnetized in a single direction, and accordingly the shapes of magnetic domains in the side-wall portions are rendered uniform; as a result only the side-wall portions between lands and grooves are reliably made nonmagnetic or in-plane magnetized film, and displacement of the domain walls of recording marks on lands or grooves occurs smoothly during recording and reproduction, so that bit error rates are reduced and other advantageous results are obtained.

Hence, according to the above manufacturing method of this invention, through only a simple modification of manufacturing process, that is, adding another annealing process to perform annealing two times, a magneto-optical recording medium with excellent recording and reproduction characteristics compared with the prior art can be provided.

DESCRIPTION OF THE PREFERRED EMBODIMENTS

Hereinafter, an embodiment of a method for manufacturing a magneto-optical recording medium according to the present invention is explained; however, this invention is not limited to the following embodiment, and numerous variations and modifications are possible.

Figure 1A:
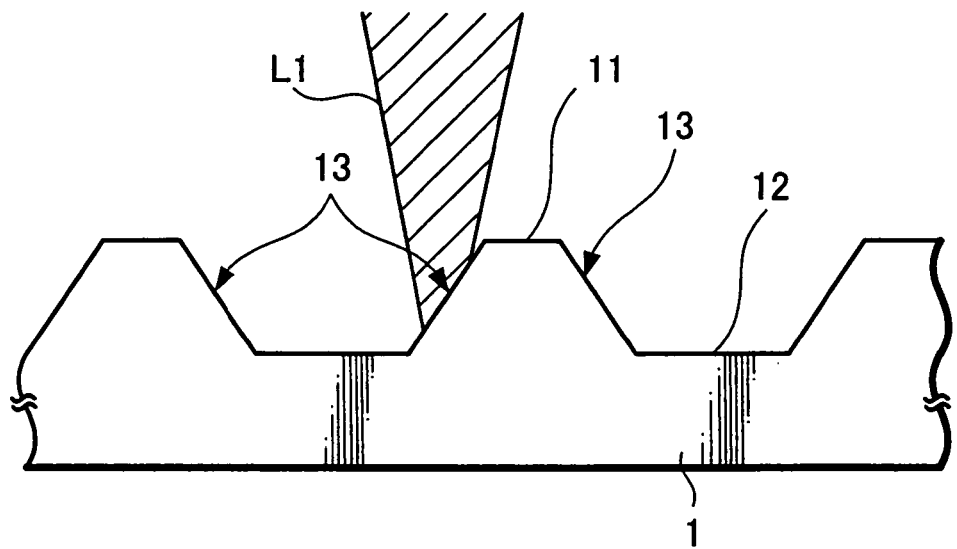
FIG. 1A is a schematic process diagram of an example of a method for manufacturing a magneto-optical recording medium.
Figure 1B:
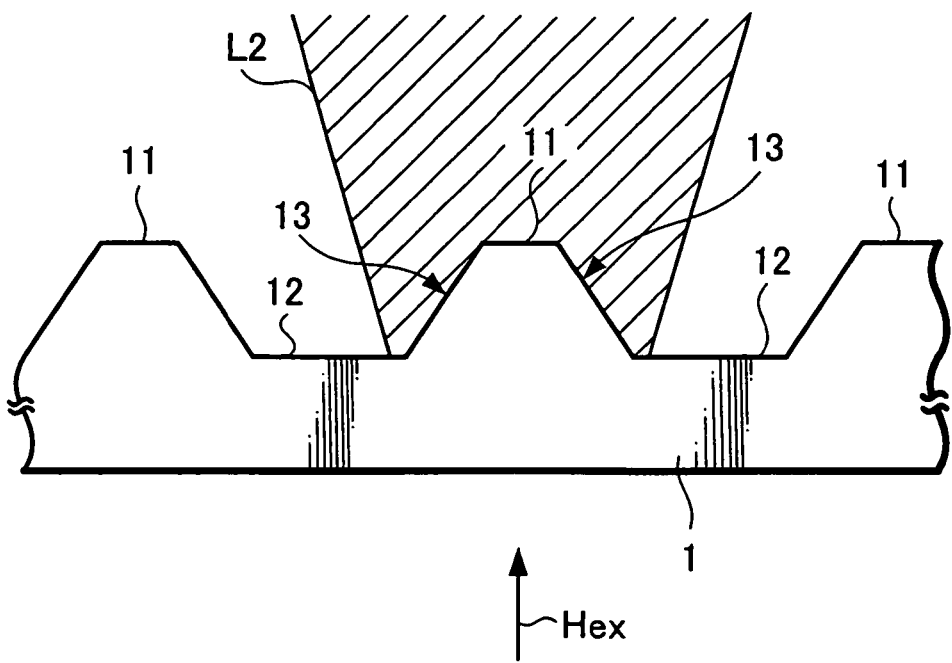
FIG. 1B is a schematic process diagram of an example of a method for manufacturing a magneto-optical recording medium.
Figure 2:
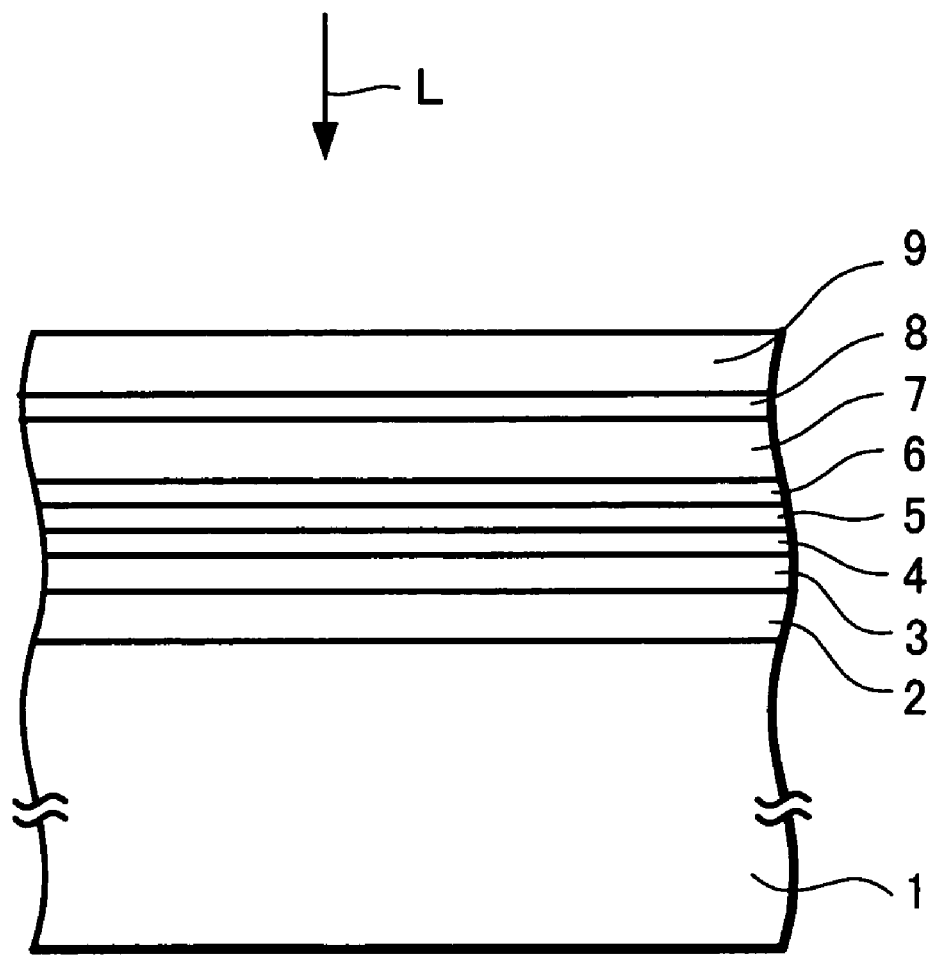
FIG. 2 is a schematic cross-sectional view of relevant portions of an example of a magneto-optical recording medium.

FIGS. 1A and 1B show the annealing processes in an example of the method for manufacturing a magneto-optical recording medium of this invention. It should be noted that as manufacturing processes prior to and subsequent to these annealing processes., the conventional methods for manufacturing various magneto-optical recording media can be used.

Specifically, after depositing photoresist or another photosensitive layer on a master substrate formed, for example, of glass, by using a laser cutting device or similar to perform optical recording and development, a so-called glass master on which is formed a groove pattern with a predetermined track pitch and depth can be fabricated. An electrocasting device is used in electroplating on the glass master, and the electroplated material is removed to manufacture a stamper for substrate molding. Then, polycarbonate (PC) or another resin is injection-molded in this stamper, or an ultraviolet-curing resin or other sheet such as polymethyl methacrylate (PMMA) may be pressed and then hardened by irradiation with ultraviolet rays, in the so-called 2P (photo-polymerization) or other method, to manufacture a substrate for a magneto-optical recording medium having grooves with a predetermined track pitch and depth.

On top of this substrate, for example a dielectric layer, a reproduction layer, an intermediate layer, a recording layer, and a dielectric layer can be deposited by sputtering or by other means, and further a protective film composed of, for example, ultraviolet-curing resin or similar can be applied by spin-coating or another method, to form a magneto-optical recording medium.

Here, the above-described reproduction layer is formed of a magnetic layer consisting of a perpendicular magnetization film with comparatively small domain wall coercive force and large domain wall mobility, the intermediate layer is formed of a magnetic layer with Curie temperature lower than those of the reproduction layer and recording layer above and below, and the recording layer is formed of a magnetic layer with large perpendicular magnetic anisotropy and capable of maintaining a magnetized state with stability within the reproduction temperature range, whereby the magneto-optical recording medium with a DWDD construction disclosed in the above-described Japanese Patent Publication No. 3332458 can be obtained.

It should be noted that this invention is not limited to a method for manufacturing a magneto-optical recording medium with such a DWDD construction, but can of course be applied to methods of manufacturing magneto-optical recording media which adopt a reproduction method including domain wall displacement in which magnetic domains are, for example, enlarged or reduced, and in particular which have a construction in which a land and groove recording method is used for recording and reproduction, and the boundary regions of recording tracks are side-wall portions of grooves.

Then, in the above-described manufacturing processes for a magneto-optical recording medium of this invention, after depositing each of the magnetic layers on the substrate, the annealing processes shown schematically in FIGS. 1A and 1B are performed.

Specifically, as shown in FIG. 1A and explained above, after depositing at least a reproduction layer and recording layer (not shown) on a substrate 1 having grooves 12, only the side-wall portions 13 between adjacent grooves 12 are irradiated with laser light L1 to perform a first annealing process; and as shown in FIG. 1B, a second magnetization annealing process is then performed while applying an external magnetic field Hex, irradiating regions including the adjacent side-wall portions 13 and land portions 11 between the side-wall portions 13 with laser light L2 having a spot diameter larger than the spot diameter of the laser light in the first annealing process.

According to this invention, as is explained in detail in the embodiment below, the side-wall portions are rendered non-magnetic or in-plane magnetized films and by magnetizing the side-wall portions, the recording and reproduction characteristics can be improved. Next, an embodiment of this invention is explained.

Embodiment

Next, an embodiment of the present invention is explained. In this embodiment, a case is explained in which the first and second annealing processes of the above FIGS. 1A and 1B are performed.

In this embodiment, this invention is applied to a magneto-optical recording medium from which reproduction of recorded information is performed using reproduction light of wavelength $\lambda=660$ nm with a numerical aperture NA of 0.60 as the reproduction optical system; and after fabricating a substrate including grooves having a predetermined pitch and width through the above-described processes of manufacturing the glass master, stamper and substrate, the magneto-optical recording medium is manufactured by depositing each of the magnetic layers, dielectric layers, and similar using sputtering or other means.

Figure 3:
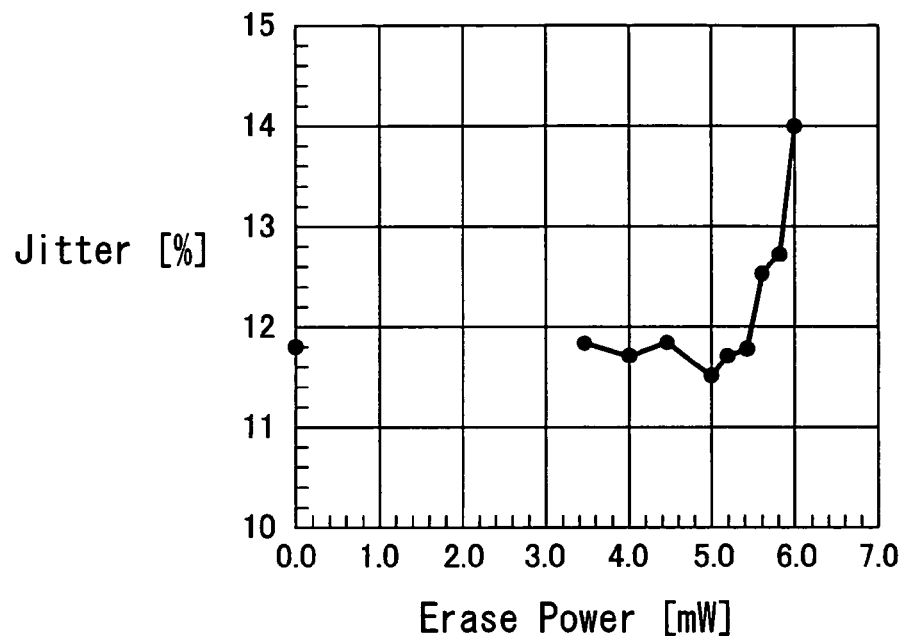
FIG. 3 is a characteristic curve showing a recording and reproduction characteristic of an example of a magneto-optical recording medium; and, FIG. 4 is a characteristic curve showing a recording and reproduction characteristic of an example of a magneto-optical recording medium.

The cross-sectional structure of each of the magnetic and other layers is, as shown in FIG. 3, constructed as follows; preparing a substrate 1 made of PC having the thickness of 0.6 mm, and on this depositing in order a 40 nm thick dielectric layer of SiN, a 30 nm thick first reproduction layer of GdFeCo, a 10 nm thick second reproduction layer of GdFe, a 10 nm thick first intermediate layer of TbFeCo, a 10 nm thick second intermediate layer of TbFeCoAl, a 50 nm thick first recording layer of TbFeCo, a 10 nm thick second recording layer of GdFeCo, and a 50 nm thick dielectric layer of SiN.

As the first annealing, this magneto-optical recording medium was irradiated as scanning with laser light of wavelength 405 nm using an optical system of numerical aperture NA=0.95 at an annealing power of 8.0 mW and a linear velocity of 4.0 m/s from the film side, that is, as indicated by the arrow L in FIG. 3 while tracking along the center of the side-wall portions between lands and grooves.

Subsequently, as the second magnetization annealing, the magneto-optical recording medium was irradiated with laser light of wavelength $\lambda=660$ nm using an optical system of numerical aperture NA=0.66 at a linear velocity of 0.96 m/s with the annealing power varied, while applying a 100 Oe ($8 \times 10^3$ A/m) magnetic field.

On the magneto-optical recording medium subjected to first and second annealings in this way, recording and reproduction was performed at a track pitch of 0.54 μm and linear density of 80 nm/bit, and jitter and the bit error rate were measured.

Figure 4:
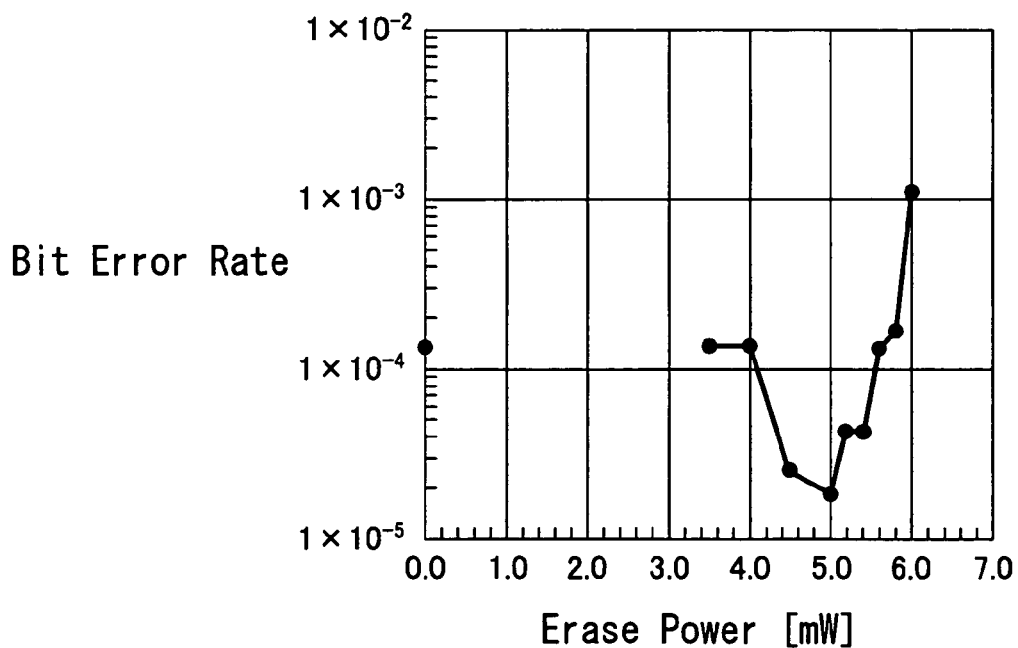

FIG. 3 and FIG. 4 respectively show changes in the jitter and bit error rate when the laser power (indicated as the erase power) in the second magnetization annealing process was varied, with respect to the recording and reproduction characteristics of lands of the above-described magneto-optical recording medium. As is clear from FIGS. 3 and 4, when the erase power which is the laser power in the second annealing process was low, the bit error rate was $1.5 \times 10^{-4}$, but this was improved to $2 \times 10^{-5}$ when the erase power was raised to 5.0 mW or so. The jitter at this time was substantially constant. When annealing was performed at powers exceeding 5.0 mW, the jitter and the bit error rate worsened. This may occur because when the laser power in the second annealing process is too high, the magnetic layer on the main track lands is annealed, and characteristics thereof are degraded.

Thus, according to this invention, after performing the first annealing on the side-wall portions, a second magnetization annealing is performed on regions including the side-wall portions while applying an external magnetic field, so that dispersed directions of magnetization are aligned in a single direction, the side-wall portions alone are reliably magnetized, and as a result domain wall displacement is effected smoothly and the recording and reproduction characteristics can be improved.

In the above-described embodiment, a case in which first and second annealing processes were performed is explained; but clearly a similarly advantageous result is obtained even when only side-wall portions are irradiated with laser light while applying an external magnetic field.

Examples of this invention and an embodiment have been explained; however, this invention is not limited to magneto-optical recording media having the materials or construction of the above explanations, and of course numerous variations and modifications of the material and construction of the magneto-optical recording media, laser light wavelengths during annealing, optical system, and similar are possible.

As described above, according to the present invention, when a magneto-optical recording medium, in which reproduction of recorded information is performed through domain wall displacement, is manufactured, after irradiating side-wall portions with laser light to perform annealing, magnetization annealing is performed in which a comparatively broad range including the side-wall portions is irradiated with laser light while applying an external magnetic field to magnetize the side-wall portions, so that the recording and reproduction characteristics of the magneto-optical recording medium can be improved.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A method for manufacturing a magneto-optical recording medium, in which at least a reproduction layer and recording layer each formed of a magnetic layer are deposited on a substrate having grooves and lands, and reproduction of recorded information is performed by means of domain wall displacement in said reproduction layer; comprising:

after depositing at least the reproduction layer and recording layer on the substrate on which are formed lands and grooves, a first annealing step in which substantially only the side-wall portions between adjacent lands and grooves are irradiated with a first laser light; and, a second magnetization annealing step, separate from the first, in which regions including said adjacent side-wall portions and said lands between the side-wall portions are irradiated with a second laser light having a spot diameter larger than the spot diameter of said first laser light while applying an external magnetic field.

2. The method for manufacturing a magneto-optical recording medium according to claim 1, wherein during said first annealing step, no external magnetic field is applied.

3. The method for manufacturing a magneto-optical recording medium according to claim 1, wherein the output power of the laser outputting the laser light during said second magnetization annealing step is substantially 5.0 mW or less.

4. A method of annealing a magneto-optical recording medium, comprising the steps of:

a first annealing step, in which substantially only side-wall portions located between adjacent lands and grooves formed in the magnetic-optical recording medium are irradiated with a first laser light; and a second magnetization annealing step, separate from the first, in which regions including said adjacent side-wall portions and said lands between the side-wall portions are irradiated with a second laser light having a spot diameter larger than the spot diameter of said first laser light while applying an external magnetic field.

5. The method of annealing a magneto-optical recording medium according to claim 4, wherein during said first annealing step, no external magnetic field is applied.

6. The method of annealing a magneto-optical recording medium according to claim 4, wherein the output power of the laser outputting the laser light during said second magnetization annealing step is substantially 5.0 mW or less.

7. The method of annealing a magneto-optical recording medium according to claim 4, wherein said grooves provide an information recording space, and the lands are used to separate adjacent recording grooves.

8. The method for manufacturing a magneto-optical recording medium according to claim 1, wherein said grooves provide an information recording space, and the lands are used to separate adjacent recording grooves.

* * * * *